United States Patent [19]

Exner et al.

[11] 4,207,784

[45] Jun. 17, 1980

[54] DEVICE FOR TURNING A NUT MEANS ON A SCREW BOLT

[75] Inventors: Gerhard Exner; Volfango Festinori, both of Berlin, Fed. Rep. of Germany

[73] Assignee: Kraftwerk Union Aktiengesellschaft, MUM/u/ lheim, Fed. Rep. of Germany

[21] Appl. No.: 878,597

[22] Filed: Feb. 16, 1978

[30] Foreign Application Priority Data

Mar. 3, 1977 [DE] Fed. Rep. of Germany ....... 2709592

[51] Int. Cl.$^2$ ............................................. B25B 21/00
[52] U.S. Cl. ........................................... 81/54; 81/125
[58] Field of Search ...................... 81/53 R, 54, 57.33, 81/57.37, 125

[56] References Cited

U.S. PATENT DOCUMENTS

| 2,632,351 | 3/1953 | Hannah | 81/125 |
| 2,978,937 | 4/1961 | Reynolds et al. | 81/54 X |
| 3,789,706 | 2/1974 | Smith | 81/125 X |

Primary Examiner—James G. Smith
Attorney, Agent, or Firm—Kenyon & Kenyon

[57] ABSTRACT

An improved device for turning a nut means on a screw bolt arranged on a bolthole circle wherein the device includes: a support ring having recesses for receiving the bolt and the nut means; a turning unit fastened to the ring for imparting rotary motion to the nut means; and a transport safety means for engaging and retaining the nut means when it reaches its unscrewed end position. In accordance with the invention, the improvement comprises employing a nut means having a threaded portion for engaging the transport safety means and including in the latter means a member attached to the support ring and in surrounding relationship to the bolt, the latter member having a counterthread and being positioned so that the threaded portion of the nut means is engaged by the counterthread before the nut means reaches its end position.

4 Claims, 2 Drawing Figures

DEVICE FOR TURNING A NUT MEANS ON A SCREW BOLT

BACKGROUND OF THE INVENTION

1. Field of the Invention

The invention relates for a device for turning a nut means on a screw bolt disposed on a bolthole circle wherein the device includes: a support ring having recesses to receiving the screw bolt and nut means; a turning unit fastened to the support ring for imparting a rotary motion to the nut means; and a transport safety means for engaging and retaining the nut means when it reaches its uncrewed end position.

2. Description of the Prior Art

A turning device for the above-type is disclosed in DT-OS No. 22 43 045. In this known device, an annular groove is machined into the nut means and the transport safety means employs a holding cam with an associated actuating piston both of which are disposed in the support ring. The holding cam is brought into engagement with the annular groove when the nut means reaches its end position and, hence, is from its corresponding bolt. As a result, the holding cam retains the uncrewed nut means in the support ring when the turning device is lifted off the structural component, such as, for example, the cover of a reactor tank with which it is being used. Accordingly, in this type of device, a separate actuating device is required for bringing the cam of the transport safety means into engagement with the nut means, which actuating device must also be actuated in a separate phase of the operation after the unscrewing of the nut means.

It is, therefore, an object of the present invention to improve the aforesaid prior art device by simplifying its transport safety means, while at the same time utilizing it for better guidance of the nut means.

SUMMARY OF THE INVENTION

In accordance with the principles of the present invention, the above and other objects are realized in a turning device as described above by providing that the screw means have a threaded portion for engaging the transport safety means and by including in the latter means a member attached to the support ring and in surrounding relationship to the screw bolt, the latter member having a counterthread and being positioned such that the counterthread is brought into engagement with the threaded portion of the nut means prior to it reaching its uncrewed end position.

The screw means of the invention may be in the form of a nut with the threaded portion thereon. Also the nut means may include a nut to which is connected a lug receiving the threaded portion.

With the present invention designed as aforesaid, the drive used to unscrew the nut means from the screw bolt also screws the nut means onto the counterthread of the member of the transport safety means. Thus a separate actuating device for the transport safety means is eliminated. Moreover, since the counterthread is engaged when the nut means is still engaging the last turns of the thread of the screw bolt, accurate guidance of the nut means is obtained and jamming or runout on the last turns of the thread is prevented. This also results in better guidance when restarting and actually rescrewing the nut means back on.

In one embodiment of the invention, the aforesaid member is in the form of a bushing mounted on the support ring. In this case, the counterthread is on one outer surface of the bushing and corresponds to the thread on the screw bolt. Furthermore, the nut means comprises a nut and the threaded portion comprises a portion of the internal thread thereof provided for engaging the screw bolt. This eliminates the need of providing the nut means with a separate thread for engagement with the counterthread of the transport safety.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
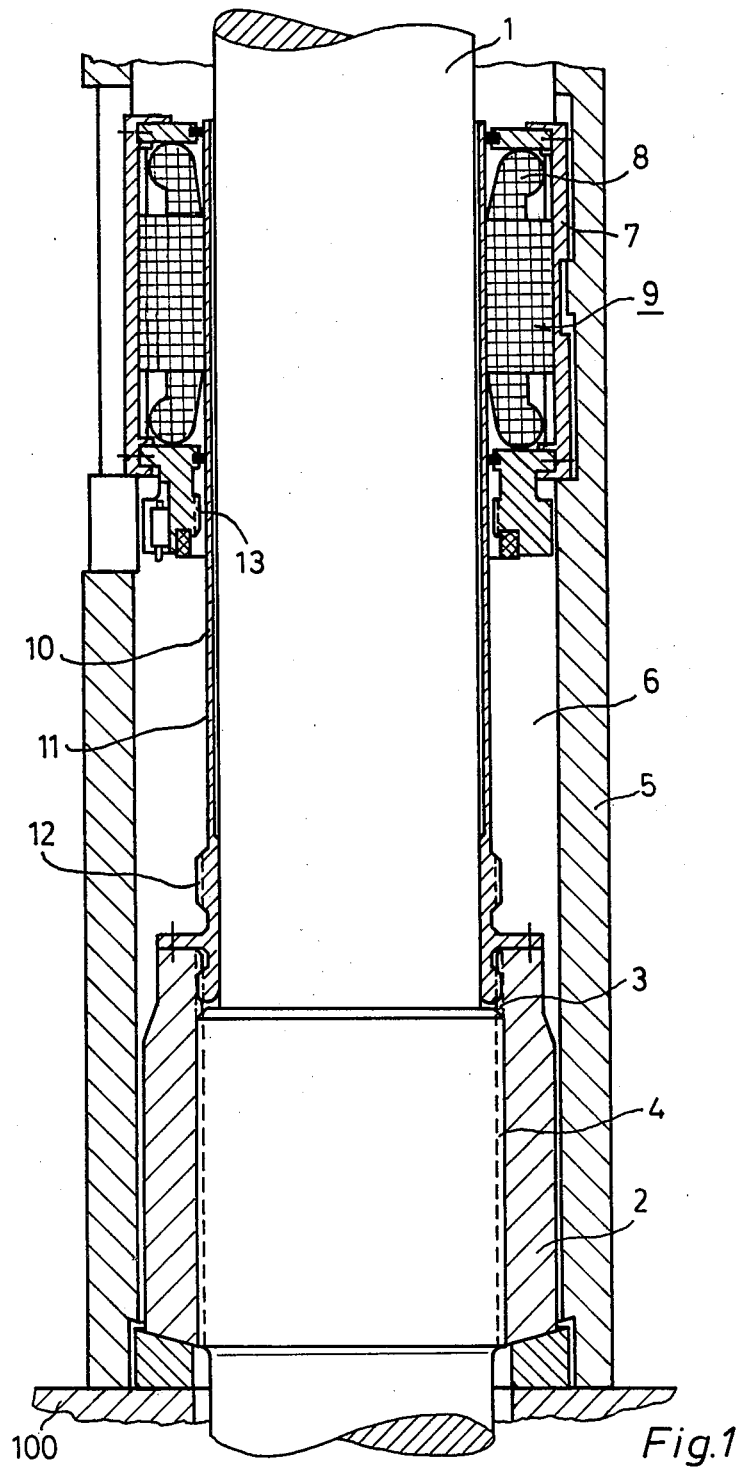
FIG. 1 shows a first embodiment of a device in accordance with the principles of the present invention.

FIG. 1 shows a screw bolt 1 which is arranged on a bolthole circle and which has a corresponding nut means 2 whose lower portion is formed as a steel cylinder with an internal thread 3. The nut means 2 is to be screwed on and off the thread 4 of the screw bolt 1 automatically so as to close and open a cover 100 such as, for example, a cover being used to cover a reactor pressure vessel or a boiler. For this purpose, a turning device in accordance with the invention is provided.

More particularly, the turning device comprises a support ring or cylinder 5 having recesses 6 for receiving the screw bolt 1 and the nut means 2. Also mounted in the support ring 5 for rotationally driving the nut means 2 is an electric motor 9 having a stator 7 which is provided with a stator coil 8. The rotor of the electric motor 9 is formed by a cylindrical lug 10 which is connected to and forms part of the nut means 2 and surrounds the screw bolt 1. More specifically, the lug 10 functions as a squirrel-cage rotor of the electric motor 9 and imparts to the nut means 2 a rotary motion in the desired direction. This then causes the nut means 2 to be screwed onto or uncrewed from the thread 4 of the screw bolt 1.

In accordance with the invention, the lug 10 of the nut means 2, adjacent to the lower internally threaded cylindrical portion of the nut means, is provided on its outside surface with a threaded portion 12. The threaded portion 12 of the lug 10 is arranged to engage a counterthread 13 located on the external surface of a member attached to the ring 5 and surrounding the bolt 1. As shown, this member forms a lower portion of the stator 7 of the motor 9. More particularly, the aforesaid member is arranged in the ring 5 such that the counterthread 13 engages the threaded portion 12 of the nut means 2 before the nut means unscrews from the thread 4 of the screw bolt 1. As a result, the nut means 2 is guided by the engaged threads 12 and 13 when it is on the last turns of the thread 4 and, therefore, does not run out. Moreover, due to the engagement of threads 12 and 13, when the nut means 2 becomes unscrewed from the thread 4 of the screw bolt 1, the nut means 2 is retained in the support ring 5 of the turning device. The nut means 2, therefore, can be lifted off the screw bolt 1 and transported away therefrom together with the turning device.

In order to facilitate the initial engagement of threaded portion 12 of the nut means 2 and counterthread 13 the stator 7 may be elastically mounted in the support ring 5.

Figure 2:
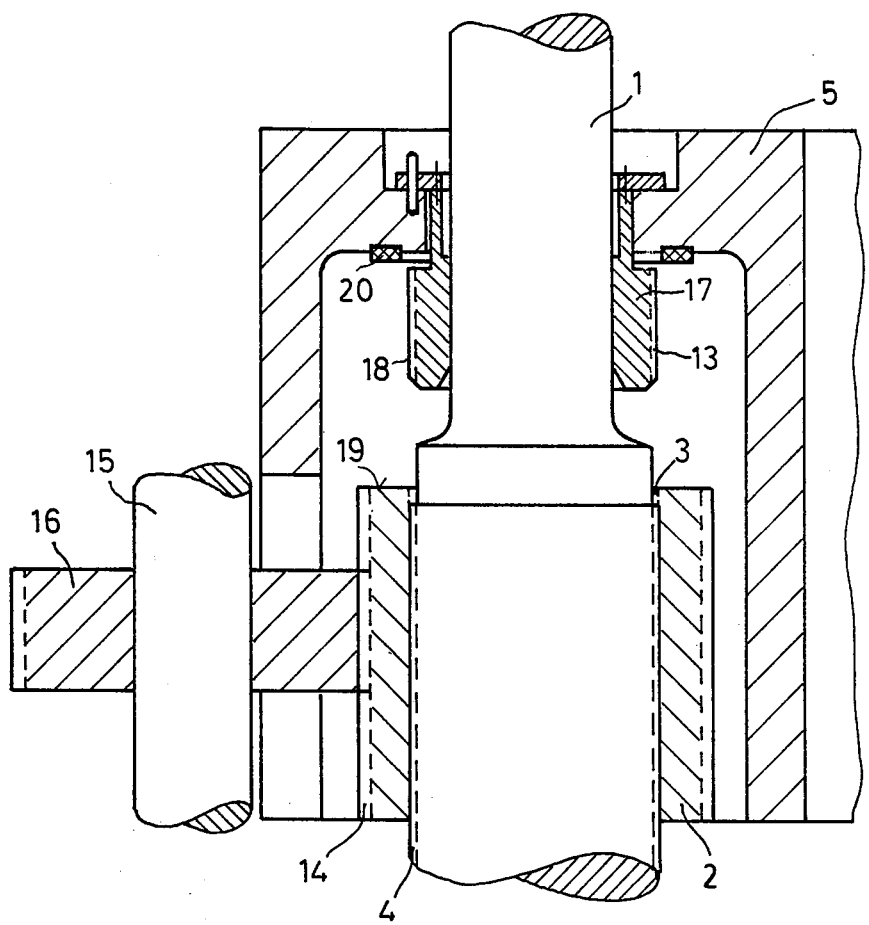
FIG. 2 shows a second embodiment of a device in accordance with the invention.

FIG 2 shows a second embodiment of the turning device in accordance with the invention. In this figure, components similar to those in FIG. 1 have been given the same numerical designations. As shown, in this embodiment, the nut means 2 is provided with and supports an external gear 14 which is engaged by a drive pinion 16 mounted on the shaft 15 of a turning unit not shown. The pinion 16 rotates the nut means 2 in the desired direction of rotation to screw it on or unscrew it from via its thread 3 the thread 4 of the screw bolt 1. The support ring 5 surrounds the nut means 2 and is adjustable so that its height relative to the screw bolt 1 can be adjusted several times before the screw means 2 reaches its end position.

Mounted to the support ring 5 is a bushing 17 which surrounds the screw bolt 1 and whose outside surface 18 is provided with a counterthread 13. The dimensions of this counterthread 13 correspond to those of the thread 4 on the screw bolt 1, and, hence, will engage the thread 2 on the screw means.

In accordance with the invention, the bushing 17 is arranged in the support ring 5 such that when the support ring is in a position whereat the screw means can be brought to its unscrewed end position, the counterthread 12 will engage the thread 2 of the screw means prior to the screw means arriving at such end position. Moreover, the bushing 17 is further arranged in the ring 5 so that it is height-adjustable by at least one turn of the counterthread 13, but is secured against rotation.

If the support ring 5 is in a position in which the nut means 2 can attain its end position, then uncrewing the nut means 2 from the screw bolt 1 will cause the internal thread 3 of the nut means 2 to be screwed onto the counterthread 13 of bushing 17 before the nut means 2 leaves the last turns of thread 4. When in its end position, the nut means 2 will then be screwed completely onto the bushing 17. Moreover, in such end position, the top face 19 of nut means 2 is brought into contact with a rubber ring 20 which is supported in the support ring 5 and which acts as antirotation device and damper due to its surface friction and elasticity. Thus, in this case, the bushing 17 retains the nut means 2 in the support ring 5 of the device so that transport of nut means 2 within the device is obtained when the device is lifted off the screw bolt 1. In addition to this transport safety, the bushing 17 provides good guidance of the nut means 2 so that it is easier to again screw the nut 2 on the thread 4 because tilting of the nut is prevented.

What is claimed is:

1. In combination:

a nut;

a lug assembled to the nut for driving it;

means for rotating the lug and driving the nut onto or off of, a screw bolt;

means for supporting the rotating means having an opening for passage of the screw bolt and the assembled lug and nut;

means including a counterthread connected to the support means for engaging the assembled lug and nut when the nut nears an end position and for retaining them when the nut is unscrewed from the bolt; and a threaded portion on the assembled lug and nut for engaging the counterthread.

2. The combination of claim 1 in which the threaded portion is on the lug.

3. The combination of claim 2 in which the threaded portion is on the external surface of the lug.

4. The combination of claim 1 in which the threaded portion engages the counterthread while the nut is on the bolt thread.

* * * * *